United States Patent [19]

Danioni

[11] 4,073,443

[45] Feb. 14, 1978

[54] COMMINUTING PLANT AT CRYOGENIC TEMPERATURES

[75] Inventor: Francesco Danioni, Milan, Italy

[73] Assignees: Italo Danioni S.d.f.; Sio-Società per l'Industria dell'Ossigeno e di Altri Gas S.p.a., both of Italy; part interest to each

[21] Appl. No.: 768,570

[22] Filed: Feb. 14, 1977

[30] Foreign Application Priority Data

Feb. 16, 1976 Italy .................................. 20192/76

[51] Int. Cl.$^2$ .............................................. B02C 23/12
[52] U.S. Cl. .................................... 241/65; 241/79.2; 241/80; 241/DIG. 37
[58] Field of Search ........... 241/79.2, 80, 65, DIG. 37

[56] References Cited

U.S. PATENT DOCUMENTS

| | | | |
|---|---|---|---|
| 357,973 | 2/1887 | Burkman | 241/80 |
| 973,761 | 10/1910 | Cline | 241/80 |
| 2,609,150 | 9/1952 | Bludeau | 241/DIG. 37 |
| 3,527,414 | 9/1970 | Schorsch | 241/DIG. 37 |
| 3,647,149 | 3/1972 | Morita et al. | 241/DIG. 37 |
| 3,666,185 | 5/1972 | Williams | 241/DIG. 37 |
| 3,718,284 | 2/1973 | Richardson | 241/DIG. 37 |

*Primary Examiner*—Granville Y. Custer, Jr.
*Attorney, Agent, or Firm*—Bacon & Thomas

[57] ABSTRACT

A plant for the cryogenic comminuting of materials which are resilient, tough or difficult to comminute at room temperature, in particular rubber and plastic material, wherein the comminuting means, the charging hopper and the feeding means for the material to be comminuted are all contained within one and the same insulated enclosure, said enclosure being in communication with the outside only over calibrated adjustable openings defining a given outflow of gas, a cryogenic liquid is introduced in the comminuting means in a quantity that is variable according to the minimum optimal temperature required in the mill for any specific comminuting operation.

7 Claims, 2 Drawing Figures

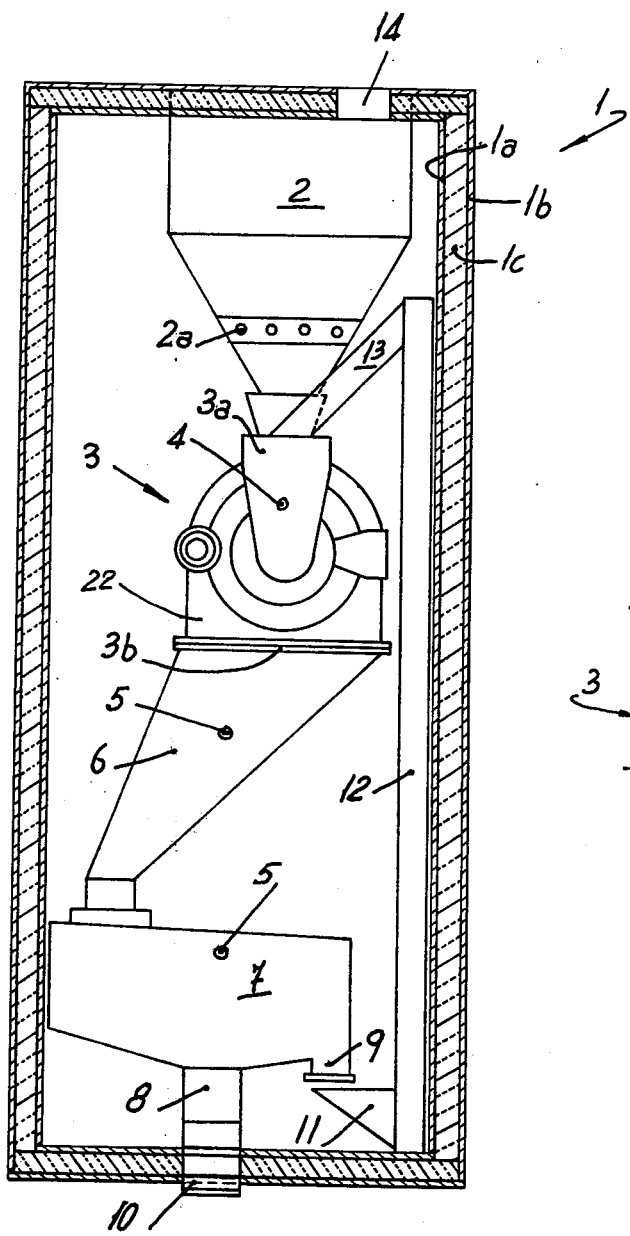
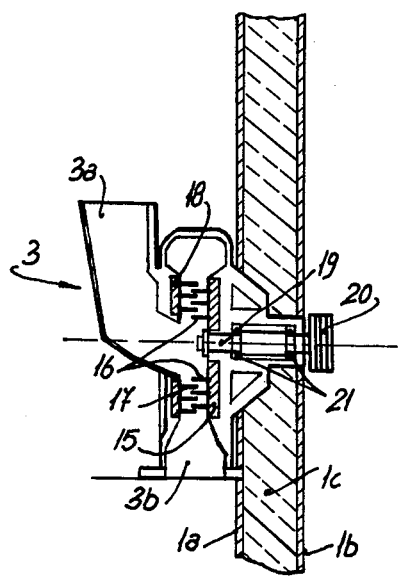
FIG.1
FIG.2

COMMINUTING PLANT AT CRYOGENIC TEMPERATURES

The present invention relates to the comminuting of those types of materials, which, at room temperature, are resilient, tough or in any case difficult to comminute while, at temperatures lower than room temperature, these materials are extremely brittle so that the comminuting may be readily carried out with a minimum energy consumption. Typical examples of such materials are elastomers, rubber and plastic materials. In particular, the invention relates to those comminuting operations which reduce the material from sizes of about 1 cm to very fine particle sizes: e.e. smaller than 500.

The fundamental technique of comminuting these substances at low temperature has been used now for some years. There have been built several comminuting plants in which the temperature of the material to be treated was lowered immediately before entering the mill, in general by introducing an inert gas such as liquid nitrogen which strongly cooled the material by absorbing therefrom its vaporization heat.

Several systems have been studied to reduce the consumption of liquified inert gas (e.g. liquid nitrogen) by utilizing the obtained gas for cooling the material to be comminuted.

There has been also widely used the method of insulating each means or machine constituting the comminuting plant e.g. besides the mill and the charging hoppers, the conveyors etc. so as to further decrease the consumption of liquid nitrogen and to render more and more economical the comminuting process at cryogenic temperatures.

A mobile comminuting plant for tires is also known which said tires are placed in a receptacle containing cryogenic liquid. Thereafter the tires are crushed or chopped to coarse peces to have the reinforcing wires removed there from. Then follows the comminuting and finally a sifting operation. The cooling and milling mechanisms are contained in an enclosure or chamber which is in communication with the outside by means of curtains enabling the tires to enter into said enclosure and also permitting free circulation of the gases from the inside to the outside. The liquified gas is contained in a receptacle and is at liquefaction temperature ($-196°$ C for instance for liquified nitrogen). The material to be comminuted reaches the liquefaction temperature because of the high heat transfer coeficent betwen liquid and solid material. Of course there is too much waste: you do not need to bring a material to vaporization or liquefaction temperature (for instance to $-196°$ C) if this material reaches embrittlement for instance at $-80°$ C. In such a plant gas comes out of the chamber through the curtains practically at liquefaction temperature without using the sensible heat which for instance for nitrogen is 50% of the total heat. Moreover before tires are moved through cryogenic liquid they can be sprayed with other cryogenic liquid always at vaporization temperature, wasting in this way even more cryogenic liquid.

In all the above mentioned conventional systems, it has been attempted to cool the material to be comminuted without having the mechanical means and devices of the plant reach an excessively low temperature, since same would become too brittle at cryogenic temperatures.

The present invention has for an important object to effect a comminuting operation temperatures lower than room temperature and variable depending on the material to be comminuted with a minimum consumption of inert gas creating a working inert and dry enviroument without any humidity.

An other object of the present invention is to provide for the sifting and the return to the mill of the particles having a size larger than a predetermined value, these operations taking place without any danger of said return devices becoming jammed or clogged as a consequence of moisture and with a minimum loss of refrigeration units because the recycling devices are in a chamber containing exclusively dry gas.

A further object of the present invention is to avoid the back pressures which up to now arose in the conventional plants due to the evaporation of nitrogen at different locations where it was introduced in accordance to the quantity and to the temperature of the material to be cooled down. It is well known that 1 lt. of liquid nitrogen develops 0.7 cm of gas at room temperature and at atmospheric pressure.

A still further object of the invention is to enable, by the utilization of a special comminuting device, to reach, inside the chamber or enclosure a uniformly low temperature that, up to now, would have caused breakage of any conventional mill made of material which at low temperatures, was excessively brittle.

The above mentioned objects have been achieved by having the comminuting of the material (which is tough at room temperature and brittle only at cryogenic temperatures) occur in such a way that the mill, the charging hopper and the conveying means are all contained within an insulated chamber or enclosure which is in communication with the outside only through adjustable openings permitting only a given gas output flow, cryogenic liquid without any moisture being introduced in the milling means in variable quantities according to the temperature which is required in the mill for any specific comminuting operation, overpressure existing in the chamber preventing the inlet of wet air from outside.

According to a first embodiment of the invention the plant is provided with a fineness control device and with a recycling device for the over-size particles (e.g. a sifting device and an associeted elevator, returning said oversize particles to the mill's input). Both these devices are inside the above mentioned enclosure. Were they disposed outside the efficiency of the plant would be impaired by the possible occurrence of cloggings due to atmospheric moisture as well as by the loss of refrigeration units.

According to a further improvement of the invention said enclosure includes suitable inspection doors.

According to a still further improvement of the present invention a temperature-responsive member is located inside the enclosure to control the introduction of cryogenic liquid to obtain constant temperature during the whole working operation. This temperature may be varied at will according to any specific requirement for the material to be treated. Actually it is useless to overcool a material which is already brittle at higher temperatures.

According to a still further improvement of the invention, the utilized mill is a high speed mill having a peripheral speed of between 80 and 120 m/sec. It is preferably of the centrifugal type having a support means on one side only. In particular, this support means is mounted in the enclosure's wall so that the associeted bearings mounted in said wall are not subjected to the temperature of the cryogenic gas inside said enclosure while an outer projection carries a pulley to be driven by a motor. The inner parts rotating at high speeds and the stationary parts coming into contact with the material to be comminuted are preferably made of stainless steel.

Finally, according to a further improvement of the invention the motors driving the machines and appuratures especially large ones, are located outside of the enclosure. In particular, as mentioned above, the mill's motor will be disposed outside the enclosure.

According to a further improvement of the invention, the pressure of the gas inside said enclosure may be controlled with conventional means such as valves and the like, also by simply varying the height of the material contained in the charging hopper to control frictional resistance to outflowing gas.

The plant of the present invention has the following advantages:

(a) Decreased consumption of liquid nitrogen per kg. of treated product. This is mainly due to the fact that the gas cloud inside the enclosure and between each apparatus and the enclosure's wall is maintained only at the temperature which is necessary for carrying out a satisfactory communiting operation for each specific treated product, whereby the heat content of the cryogenic fluid is used to the utmost. In the system comprising the recycling of the over-size material the nitrogen consumption is very low also because said recycling takes place within the enclosure and therefore there is no loss of refrigeration units in the return path to the mill.

(b) No cloggings of the sifting and cold recycling devices for the materials. This feature is extremely advantageous since any contact with the outside causes atmospheric moisture absorption and, as a consequence thereof agglomerations and even occlusions of the recycling means and in particular of the elevator and the associated charging and discharging chutes. Eliminating the danger of cloggings in said means was up to now impossible since the sifting devices were separated from the other apparatuses and hence, even if insulated, they were subjected to atmospheric moisture absorption. In the plant of the present invention, on the contrary, the sifting and recycling devices for the material are contained in one and same enclosure in which there is no moisture because the gas contained is dry.

(c) extreme simplification of the nitrogen-gas circuit with diminished energy consumption for the nitrogen circulation. In fact, the liquid nitrogen is introduced at one or more locations into the mill and possibly into other machines conteined in said enclosure while the output of the produced gas takes place through holes located on the machines so that the gas cloud freely circulates within the enclosure and penetrates into holes provided in the materiel charging hopper, precooling said material after it flows out from calibrated and ajustable openings. Hence there are only provided pipings for feeding the liquid nitrogen into the mill or into the other machines and for receiving the gaseous nitrogen at the output of the charging hopper and of the discharge valves. Up to now gaseous nitrogen flowed in pipes where it was moved at higher pressures and at higher velocities. Gas friction caused therefore an increase of heat which had to be compensated by other refrigeration units (d) Complete elimination of the back pressures which could arise at the moment the gaseous nitrogen is generated in the machines. This is due to the fact that all the breather output pipes are located in the same room where the pressure is adjustable, uniform and not so high as in the preceding plants having pipes for gaseous nitrogen.

The characteristic feature and advantages of the invention will become more clearly apparent from the description which follows below, given by way of example only and relating to the special embodiment illustrated in the accompanying drawing, in which:

FIG. 1 is a diagrammatic view of a plant according to the present invention in which the enclosure is sectioned to show all the machines contained therein.

FIG. 2 is a sectional view through the mill mounted within said enclosure.

With reference to the drawing, the plant comprises an enclosure 1, the peripheral walls of which are made of two surfaces e.g. of metal, an inner one 1a and an outer one 1b with an insulating layer 1c being located therebetween.

Inside the enclosure 1 there is provided a hopper 2 adapted to receive the material through an opening 14 which may be of selected size and having a feeding valve not shown for the material inserted therein and an adjustable vent means (not shown) for the outflow of the cryogenic gas.

The hopper 2 discharges the material directly into the mill 3, and in particular into its funnel 3a, whereafter said material reaches the inside of the mill and undergoes the desired grinding process.

The mill 3 consists in particular of a centrifugal rod mill in which the rotating disc 15 carrying the rods 16 rotates very rapidly with a peripheral speed of between 80 to 120 m/sec. The rods 16 pass between the rods 17 carried by a stationary disc 18 placed just in front of said disc 15. Both, the discs and the rods are made of stainless steel so as to resist the very low temperatures they are subjected to. The rotating disc 15 is set into rotation and is carried at one end of a shaft 19 the opposite end of which has a pulley 20 mounted thereon and connected with a motor (not shown). The shaft 19 is supported by two bearings 21 located in the insulating layer 1c so as not to be subjected to the low temperature of the comminuted material but to a higher temperature which is favourable for their working conditions.

The liquid nitrogen for cooling is introduced into the hopper 3a by a tube (not shown) and through an opening 4. The generated cryogenic gas flows out into the enclosure through openings shown at locations 5. The output 3b of said mill is connected with a conveying hopper 6 feeding the comminuted material to the entrance of a sifting device 7 which discarges in 8 that portion of the material which has the required size while it discharges at 9 the over-size comminuted material.

The material from tube 8 passes through a seal valve 10 and may be utilized directly since it already has the required fineness. The material from output 9 must be recycled into the mill 3. In particular, said over-size material is first received in a small receptacle 11 conveying the partially comminuted material into a mechanical or pneumatic elevator 12 hoisting the material up to a chute 13 from which said material is discharged again into the funnel 3a of the mill 3.

A nitrogen cloud is so created inside the enclosure by continuousey inserting liquid nitrogen which expels or ejects from the enclosure pre-existing air. Obviously this nitrogen cloud has a uniform pressure and this pressure is maintained at a given level with normal conventional means such as calibrated valves and in particular with the calibrated opening 14 as well as by varying the height of the material contained in the charging hopper. The liquid nitrogen introduced at 4 into the mill and possibly in other plant components is transformed into a cloud of gaseous nitrogen which penetrates into the holes 2a provided in the charging hopper 2 then, upon having cooled all the material contained in said hopper, flows out of the calibrated adjustable opening 14. By adjusting the height of the material in the hopper 2 it is possible to vary the outflow speed of the cryogenic gas.

The temperature inside the enclosure may also be controlled by means of any suitable thermic feeler which may be located at the position indicated by numeral 22 and adjusted by introducing more or less liquid notrogen into said enclosure, in response to changes detected by the thermic feeler, so as to maintain the enclosure at a temperature only slightly below the value necessary for the comminuting operation of each specific material.

Should liquid nitrogen be used as the cryogenic fluid, the vaporization temperature of the nitrogen is $-196°$ C. Thus, the gaseous nitrogen will initially be at this temperature. According to the present invention, it is possible to utilize all the cooling effect of the nitrogen ranging from $-196°$ C up to e.g. $-50°$ C this last being the temperature which is required for the comminuting of rubber.

In operation, it is to be noted that material entering opening 14 follows a more or less enclosed path through hopper 2, grinder 3, chute 6, sifter 7 and discharge 8, all within the enclosure 1. Liquid nitrogen is conducted to opening 4 and directed onto the material in the grinder where it vaporizes and chills the material for proper grinding. The gas thus formed would normally create a back pressure resisting feed of material to the grinder but the openings 5 permit that gas to be released into the enclosure 1 where it forms a frigid atmosphere surrounding all the mechanisms in the enclosure. Gas is permitted to escape from the enclosure through openings 2a and through any material in hopper 2 before it leaves the enclosure through opening 14. Obviously, the height of material in hopper 2 may be used to regulate the frictional resistance to outflow of the gas and thus offers a way to control the pressure and temperature within the enclosure. With this apparatus, the gas ultimately discharged from the enclosure may be at a relatively high temperature, the cooling effect of the liquid nitrogen having been utilized to a maximum degree thus rendering the operation not only efficient but economical. By virtue of the frigid atmosphere in the enclosure, no appreciable heat is absorbed by the mechanisms therein and the full refrigerating effect of the vaporizing nitrogen is utilized.

The structural components described above are not limitative but are only given by way of example. Instead of them there could be provided for instance screw feeding conveyors, elevators of any other type, hoppers, chutes or funnels of any form and shape. Furthermore, the device for the fineness control of the comminuted material could be a sifting machine or any other separating system built according to any conventional method generally used in the field of granulometric separation.

I claim:

1. A plant for comminuting materials that are difficult to comminute at room temperature, comprising:
    means defining a closed enclosure having heat insulated walls;
    a charging hopper in said enclosure and a charging opening in said enclosure for directing feed material into said hopper;
    comminuting means in said enclosure positioned to receive material from said hopper and further means in such enclosure for directing ground material from said comminuter out of said enclosure;
    means for directing a cryogenic liquid onto material in said comminuter and additional means for freely releasing cold gas from said comminuter and further means into said enclosure to maintain a refrigerated atmosphere therein; and
    controllable release means for releasing gas from said enclosure at a selected controlled rate to maintain a predetermined temperature and pressure in said enclosure and the means therein.

2. A plant as defined in claim 1 wherein said further means includes a sifting device and a device for recycling over-size particles to said comminuter, all within the atmosphere in said enclosure.

3. A plant as defined in claim 1 wherein said comminuting means and said further means include enveloping housings in said enclosure, said additional means being openings in said housing to release gas and pressure therefrom into said enclosure.

4. A plant as defined in claim 1 wherein said comminuter is a centrifugal mill having at least the rotating parts thereof made of a stainless steel.

5. A plant as defined in claim 4 wherein said centrifugal mill includes a drive shaft extending outwardly through a wall of said enclosure and journalled in bearings within said heat insulated wall.

6. A plant as defined in claim 1 wherein said release means includes directing means for directing gas from the atmosphere in said enclosure into said charging hopper to pass through feed material therein and to said charging opening whereby the quantity of material in said hopper may be varied to regulate the resistance to flow of gas therethrough.

7. A plant as defined in claim 1 including a thermic feeler at a selected position adjacent said comminuter for detecting the temperature at said location whereby the rate of feed of cryogenic liquid to said comminuter may be regulated to maintain a desired predetermined temperature at said location.

* * * * *